United States Patent Office 2,895,991
Patented July 21, 1959

2,895,991

NEW CHLOROMETHYLATED ANILIDES

David I. Randall, New Vernon, N.J., and Edgar E. Renfrew, Jr., Easton, Pa., assignors to General Aniline & Film Corporation, New York, N.Y., a corporation of Delaware No Drawing. Application November 6, 1956
Serial No. 620,583

8 Claims. (Cl. 260—558)

This invention relates to new and useful chlormethylated anilides and their methods of preparation.

While the chlormethylation of organic compounds is a very well developed field in organic chemistry, it is equally well known that many classes of compounds do not operate in the normal chlormethylation reaction to give chloromethyl derivatives. Among such classes of compounds are the aromatic amines. As pointed out in "Organic Reactions," vol. 1 (published by John Wiley & Sons, Inc.) page 66, it has not been possible to isolate simple chloro derivatives of aromatic amines and it is further stated therein "These could hardly be expected to be stable . . ." Notwithstanding this positive acknowledgement and well known fact of the inoperability of the general class of aromatic amines and, further, in view of the complete absence of any prior art relating to the use of anilides as precursors for the compounds and in the processes of this invention, we have unexpectedly discovered that a restricted class of aromatic amine derivatives, namely, anilides, can be successfully chlormethylated in the anilide nucleus and the resultant products made useful in many fields of endeavor.

It is therefore an object of this invention to provide a process for the preparation of chloromethyl derivatives of certain aromatic anilide derivatives.

It is a further object of this invention to provide a process for the preparation of nuclear substituted chloromethyl derivatives of di-anilides.

It is a still further object of this invention to provide new and useful nuclear substituted chlormethylated di-anilides and methods for the prepartion of same.

It is another object of this invention to provide mono- and polychlormethylated di-anilides chlormethylated in the benzenoid nucleus and process for preparing same.

Other objects of the invention will appear as the description proceeds.

The process of this invention pertains to the preparation of chloromethyl derivatives, that is, monochloromethyl or polychloromethyl of di-anilides, the latter having the following general formula:

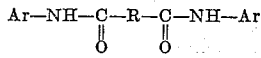

wherein R represents an alkylene radical of at least two carbon atoms or an arylene radical such as phenylene, diphenylene, naphthalene and the like, Ar represents a benzene nucleus which may contain one substituent such as alkyl, nitro or halo and/or no more than two additional lower alkyl substituents, that is, alkyl groups of from about 1 to 6 carbon atoms. In addition, the benzene nucleus should have at least one of the positions ortho or para to the amido group free of substituents.

The general process for the preparation of the compound encompassed by this invention involves the chlormethylation of the subject di-anilide with a solution of at least an equimolar amount of bischloromethylether in sulfuric acid monohydrate which may or may not contain concentrated sulfuric acid (96% sulfuric acid). The mixture of the chlormethylating agent in the sulfuric acid is cooled to about —5 to +30° C. and preferably about 0° C. and the requisite amount of the di-anilide is then added slowly (or vice versa). Upon completion of the addition of the di-anilide the reaction mixture is maintained at about 5 to 25° C. and preferably 5 to 15° C. for several hours after which the mixture is poured into ice and water. A precipitate results which is isolated and purified in the usual manner and gives rise to the desired chlormethylated di-anilide. Where it is desired to obtain a monochlormethylated product, a mixture of sulfuric acid monohydrate and concentrated sulfuric acid of 96% concentration is employed. Polychlormethylated products are obtainable with such a mixture with certain di-anilides but with others it is necessary to employ the sulfuric acid monohydrate undiluted with any 96% sulfuric acid. The general reaction herein involved may be depicted as follows:

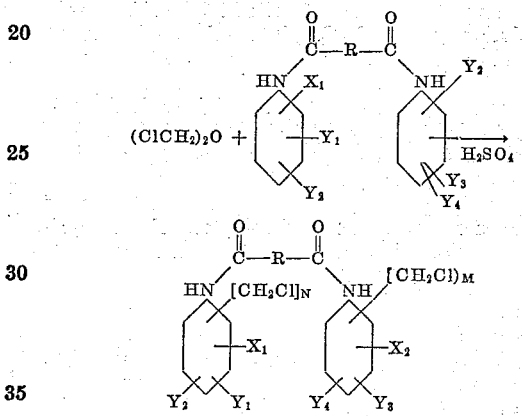

wherein R is as indicated above, $X_1$ and $X_2$ represent hydrogen, nitro or halo, $Y_1$, $Y_2$, $Y_3$, and $Y_4$ represent hydrogen or alkyl, N and M represent 0, 1, 2, or 3, there being at least one $CH_2Cl$ group present; at least one of position ortho or para to the acylamino group is unsubstituted.

Suitable dibasic acids useful in preparing the di-anilide compounds employed in this invention include:

Succinic acid
Glutaric acid
Adipic acid
Pimelic acid
Suberic acid
Azelaic acid
Sebacic, and the like
Phthalic acid
Isophthalic acid
Terephthalic acid
Diphenic acid
o,p'-Diphenyldicarboxylic acid
m,m'-Diphenyldicarboxylic acid
Naphthalene dicarboxylic acids e.g.,
  1,8-dicarboxylic acid
  1,5-dicarboxylic acid
  1,2-dicarboxylic acid The process of this invention makes available in a simple and efficient manner valuable chlormethylated derivatives of amino-containing aromatic compounds. These chlormethylated derivatives are exceptionally valuable and useful as intermediates in the preparation of a great variety of different types of compounds. The chlormethylated products resulting from the processes of this invention may be employed to form new, useful and valuable quaternary compounds by reacting same with an appropriate tertiary base such as pyridine and

EXAMPLE 1

*Preparation of p-chloromethyl adipanilide*

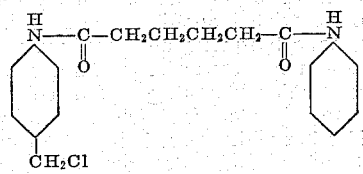

29.4 g. of adipanilide are added slowly to a solution of 34.0 cc. of bischloromethyl ether in 120 cc. of sulfuric acid monohydrate and 85 cc. of 96% sulfuric acid which solution is at 0° C. The mixture is stirred for two hours maintaining the temperature between 5 and 15° C. The reaction mass is then poured into ice and water and the resultant precipitate is filtered, washed and dried. Yield=32.0 g. M.P.>280° C. The product analyzes for one chlorine atom. The pyridinium salt of this chloromethylated product is prepared by warming a mixture of 1 g. of said product in 10 cc. of pyridine on a steam bath for 10 minutes. Excess pyridine solvent is volatilized and the residue of the pyridium salt.

EXAMPLE 2

The procedure of Example 1 is repeated except that the 96% sulfuric acid is omitted and the reaction time is extended to 16 hours. A symmetrical bischloromethyl derivative is obtained having the formula

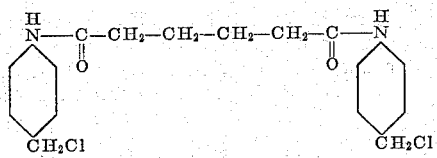

EXAMPLES 3–6

The procedure of Example 1 is repeated employing 0.1 moles of the following dianilides:

Example 3: succinanilide
Example 4: glutaranilide
Example 5: terephthalanilide
Example 6: dianilide of naphthalene 1,8-dicarboxylic acid Excellent yields of monochloromethyl derivatives are obtained in each instance.

EXAMPLES 7–11

The procedure of Example 2 is repeated in the preparation of bischloromethyl derivatives employing the following dianilides:

Example 7: succinanilide
Example 8: glutaranilide
Example 9: suberanilide
Example 10: dianilide of naphthalene 1,8-dicarboxylic acid
Example 11: dianilide of sebacic acid Pure yields of the bischloromethyl derivatives are obtained similarly as in Example 2.

In addition to the simple unsubstituted anilides described and exemplified above, one may also employ anilides containing substituents in the aromatic nucleus. Such substituents may be nitro, halo and/or alkyl. Of course at least one of the ortho or para positions must be available for chloromethylation for the process of this invention to obtain. As substituted anilines which are suitable as precursors for the dianilides to be chloromethylated there may be employed the following:

p-Toluidine
m-Toluidine
o-Toluidine
o-Anisidine
p-Phenetidine
p-Anisidine
o-3-xylidine
o-4-xylidine
p-Xylidine
m-2-xylidine
m-4-xylidine
m-5-xylidine
m-Chloroaniline
p-Amido ethyl benzene
p-Amido propyl benzene
m-Bromoaniline
m-Nitraniline, and the like In addition to those specific anilides described and exemplified above, other suitable dianilides which may be employed to prepare the chloromethylated derivatives of this invention include the following:

α-Methyl glutaranilide
α-Ethyl α-methyl malonanilide
α-Methyl malontoluide
α-Ethyl succinanilide
Malontoluide
Glutarotoluide
α-Butyl malonanilide
Ethyl p-malontoluide
Pimelanilide
α-Isopropyl succinanilide
Dimethyl adipanilide
Adipotoluide
β-Propyl glutaranilide
α-Methyl p-glutarotoluide
Isoamyl malonanilide
α-Propyl, p-malonotoluide
Suberanilide
α-Ethyl, p-succinotoluide
Azelaanilide
α,γ-Dimethyl p-glutarotoluide
α-Hexyl malonanilide
γ,γ-Dimethyl pimelanilide
Pimelotoluide
α-Isopropyl, δ-methyl adipanilide
Suberotoluide
Azelatoluide
α,γ-Dimethyl p-glutarotoluide
Sebacotoluide
Brassylanilide
δ-Isopropyl-α-methyl p-pimelotoluide
Brassylotoluide
Malonophenetide
α-Propyl p-malonotoluide
Suberanilide
α-Ethyl-p-succinotoluide
Dichloromalonoxylide
α-(2,2-dichloroethyl)-p-succinotoluide
α-Chloro-α(chlorethyl)-malonanilide
Dichlorosuccinanilide
α,α-Dichloromalonotoluide
α-Chloro-α(chloromethyl)-malonotoluide
α-(2,2-dichloroethyl)-succinanilide

*Preparation of quaternized compounds*

The general procedure for preparing the quaternized derivatives of the chlormethylated anilides of this invention follows techniques well known in the art for other quaternary preparations. Thus a suitable tertiary base such as pyridine, quinoline, picoline, lutidine, triethylamine, dimethylaniline, and the like, in a proportion of at least 1 mole thereof per mole of chlormethyl group is employed. It is preferred and more convenient to add the chlormethylated compounds to a considerable excess of the stoichiometric amount of base. About 10 times the theoretical equivalent amount of base is preferred and in this proportion the latter acts not only as a chemical reactant but also as a solvent or suspending medium. The mixture or solution is then gently warmed, for example, on a steam bath, for a few minutes and this completes the quaternization reaction. The resultant quaternary compound may be isolated in any of the well known ways and conveniently, simply by evaporation of the excess base.

As indicated above, the chlormethylated products obtainable by the processes of this invention may be either monochlormethylated or dichlormethylated products depending upon the particular anilide employed as the precursor for the chlormethylated derivatives and also depending upon the specific chlormethylating conditions and proportions. In general, the presence of methyl substituents in the aromatic nucleus of the anilide tends to increase the formation of dichlormethylated products whereas halogen and nitro substituents tend to favor the formation of monochlormethylated products. The absence of substituents other than the acylated amino group in general leads to the formation of monochlormethylated products but dichlormethylated products may usually be formed if the reaction is carried out over an extended time and preferably with 100% sulfuric acid as the carrier for the chlormethylating reagent.

We claim:
1. Nuclear chloromethylated derivatives of compounds having the formula:

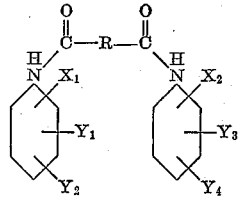

wherein R is an alkylene radical, $X_1$ and $X_2$ are selected from the group consisting of hydrogen, nitro, halo, and $Y_1$, $Y_2$, $Y_3$ and $Y_4$ are selected from the group consisting of hydrogen, alkyl of less than about six carbon atoms and alkoxy.
2. Nuclear chloromethylated adipanilide.
3. Nuclear monochloromethylated adipanilide.
4. Nuclear bischloromethylated adipanilide.
5. Nuclear chloromethylated succinanilide.
6. Nuclear monochloromethylated succinanilide.
7. Nuclear bischloromethylated succinanilide.
8. Nuclear chloromethylated terephthalanilide.

References Cited in the file of this patent

Fuson et al.: Organic Reactions, vol. 1, pp. 63–90 (1942).

Randall et al.: Chem. Abs., vol. 49, p. 1812 (1955).